(12) United States Patent
Vandermeijden et al.

(10) Patent No.: US 11,099,687 B2
(45) Date of Patent: Aug. 24, 2021

(54) TEMPERATURE COMPENSATION AND NOISE AVOIDANCE FOR RESONATOR PEN

(71) Applicant: Synaptics Incorporated, San Jose, CA (US)

(72) Inventors: Tom R. Vandermeijden, Los Gatos, CA (US); Jeffrey Lukanc, San Jose, CA (US); Timothy J. Vehling, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 98 days.

(21) Appl. No.: 15/710,169

(22) Filed: Sep. 20, 2017

(65) Prior Publication Data

US 2019/0087052 A1 Mar. 21, 2019

(51) Int. Cl.
*G06F 3/041* (2006.01)
*G06F 3/044* (2006.01)
*G06F 3/0354* (2013.01)
*G06F 3/038* (2013.01)

(52) U.S. Cl.
CPC .......... *G06F 3/0418* (2013.01); *G06F 3/0383* (2013.01); *G06F 3/03545* (2013.01); *G06F 3/044* (2013.01); *G06F 3/04166* (2019.05)

(58) Field of Classification Search
None
See application file for complete search history.

(56) References Cited

U.S. PATENT DOCUMENTS

| | | | |
|---|---|---|---|
| 2012/0313865 A1* | 12/2012 | Pearce | G06F 3/0416 345/173 |
| 2014/0253468 A1* | 9/2014 | Havilio | G06F 3/03545 345/173 |
| 2016/0147320 A1* | 5/2016 | Krumpelman | G06F 3/044 345/179 |
| 2016/0179271 A1 | 6/2016 | Vandermeijden | |

* cited by examiner

*Primary Examiner* — Andre L Matthews
(74) *Attorney, Agent, or Firm* — Paradice & Li LLP (57) ABSTRACT

Methods and devices are disclosed for characterizing user inputs. A first input object may be detected in a sensing region of an input device. A resonance frequency of the first input object may be determined. A first characteristic may be assigned to the first input object based at least in part on the resonance frequency of the first input object. User inputs provided by the first input object may be processed based at least in part on the first input object characteristic.

18 Claims, 8 Drawing Sheets

TEMPERATURE COMPENSATION AND NOISE AVOIDANCE FOR RESONATOR PEN

TECHNICAL FIELD

The present embodiments relate generally to capacitive sensing, and specifically to capacitive sensing of resonating devices on a touch-sensitive screen.

BACKGROUND OF RELATED ART

Input devices including position sensor devices (also referred to as touchpads, touch sensor devices, or proximity sensor devices) are widely used in a variety of electronic systems. A position sensor device typically includes a sensing region, often demarked by a surface, in which the position sensor device determines the presence, location, and/or motion of one or more input objects. Position sensor devices may be used to provide interfaces for the electronic system. For example, position sensor devices are often used as input devices for larger computing systems (such as opaque touchpads integrated in, or peripheral to, notebook or desktop computers). Position sensor devices are also often used in smaller computing systems (such as touch screens integrated in cellular phones).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Methods and apparatus are disclosed for characterizing user inputs. An example method includes detecting a first input object in a sensing region of an input device, determining a resonance frequency of the first input object, assigning a first characteristic to the first input object based at least in part on the resonance frequency of the first input object, and processing user inputs provided by the first input object based at least in part on the first characteristic.

In another example, an input device is disclosed. The input device may include one or more processors, a touch-sensitive sensing region, and a memory, storing one or more programs comprising instructions. The instructions, when executed by the one or more processors, cause the input device to detect a first input object in the touch-sensitive sensing region, determine a resonance frequency of the first input object, assign a first characteristic to the first input object based at least in part on the resonance frequency of the first input object, and process user inputs provided by the first input object based at least in part on the first characteristic.

In another example, a non-transitory computer-readable storage medium is disclosed, storing instructions, that may be executed by processing circuitry of an input device. The instructions execute to cause the input device to perform operations including detecting a first input object in a sensing region of an input device, determining a resonance frequency of the first input object, assigning a first characteristic to the first input object based at least in part on the resonance frequency of the first input object, and processing user inputs provided by the first input object based at least in part on the first characteristic.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

Figure 1:
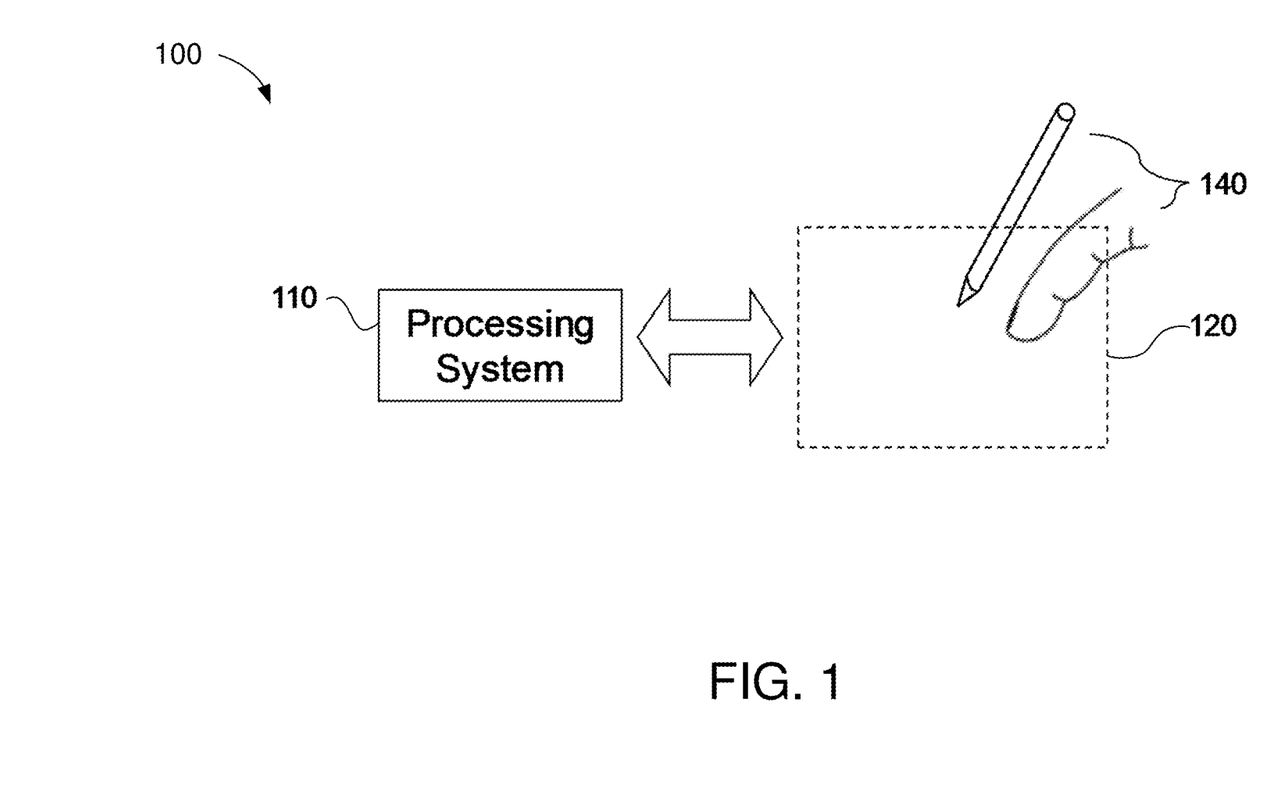
FIG. 1 shows an example input device within which the present embodiments may be implemented.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example technologies may include Inter-Integrated Circuit (I$^2$C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a position sensor device (e.g., also referred to as a "touchpad" or "touch sensor device," or "proximity sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes.

The processing system 110 may be configured to operate the hardware of the input device 100 to detect input in the sensing region 120. In some embodiments, the processing system 110 may control one or more sensor electrodes to detect objects in the sensing region 120. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. In some other aspects, the processing system 110 may determine positional information for a detected input. The term "positional information," as used herein, refers to any information describing or otherwise indicating a position or location of the detected input. Example positional information may include absolute position, relative position, velocity, acceleration, and/or other types of spatial information.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology. In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, the processing system 110 may detect user input in the sensing region 120 based on changes in an electric field (or capacitance level) provided by corresponding sensor electrodes. More specifically, the processing system 110 may continuously (or periodically) detect the capacitance of a sensor electrode and compare the detected capacitance against a baseline capacitance level (e.g., corresponding to a state of the sensor electrode when no input is detected). The processing system 110 may sense a user input in a given portion of the sensing region 120 if the capacitance detected across one or more sensor electrodes in the given portion differs from their respective baselines by a threshold amount. Therefore, the accuracy and/or likelihood with which the processing system 110 is able to detect a user input may depend, at least in part, on the capacitive properties of the input object 140. For example, objects with "stronger" capacitive properties (e.g., causing greater changes in the electric field of the sensing region 120) are more likely to be detected than objects with "weaker" capacitive properties (e.g., causing relatively small changes in the electric field of the sensing region 120).

In some embodiments, the processing system 110 may be configured to detect and characterize user inputs with different resonance frequencies. Such user inputs may be provided by input objects having different input object characteristics, which may be identified by the processing system 110. An example input object may comprise a pen or stylus having an inductor. Such pens or styluses may be passive pens or styluses, which are not designed to store energy for an extended period of time. A passive pen is a type of input object that may be detected by capacitive sensing input devices. The passive pen interacts with a capacitive sensing device by altering the measured capacitance (or electric field) of the input device. In other words, a passive pen interacts with the input device in a way similar to how a finger interacts with the input device. In contrast to an active pen that sends an electrical signal to an input device using an internal power source, a passive pen does not actively transmit a signal to the sensing device. Rather, the only input to the capacitive sensing device is based on the detection, by the capacitive sensing device, of the passive pen.

Figure 2:
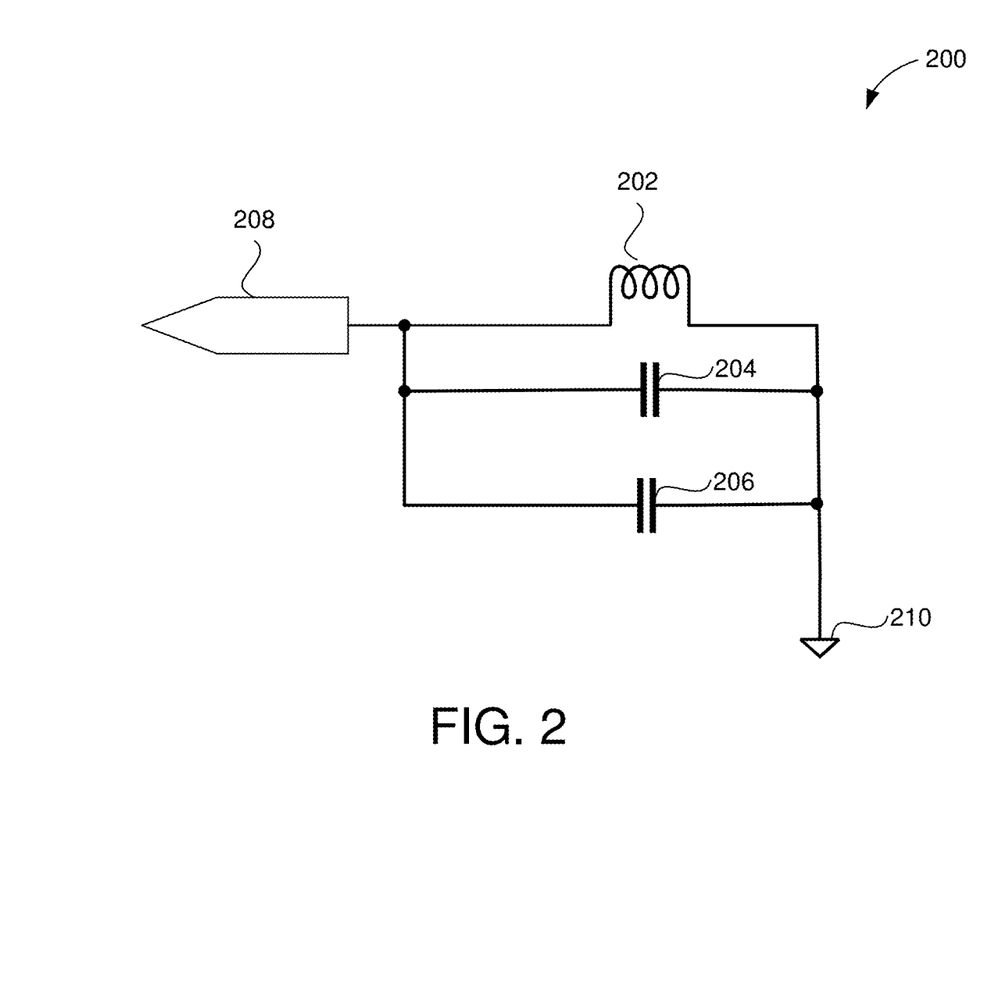
FIG. 2 is a block diagram of an input object in accordance with some embodiments.

FIG. 2 shows an example circuit diagram of an input object 200 in accordance with one or more embodiments. The input object 200 may be a resonating pen or stylus in some embodiments. As shown in FIG. 2, the input object 200 may include an inductor 202, a trim capacitor 204, and a capacitor 206. Although not shown for simplicity, input object 200 may also have parasitic resistance and parasitic capacitance. The parasitic resistance and parasitic capacitance may have various degrees of magnitude and may be accommodated during a turning procedure. For example, the trim capacitor 204 may be adjusted to compensate for the parasitic capacitance. A capacitance may also exist between input object 200 and an input device (not shown for simplicity). Input object 200 may also include a grounding element 210. The grounding element 210 may be provided by a conductive grip area of input object 200. For example, an outer surface of a resonating pen or stylus may be electrically coupled to free space 210 so that a user grasping the resonating pen cause the pen to be coupled to free space via the body of the user.

With reference for example to FIG. 1, sensor electrodes in the sensing region 120 may be driven with sensing signals having one or more defined frequencies. In accordance with one or more embodiments, input object 200 may be configured to resonate at a predetermined frequency. For example, the predetermined frequency may be substantially similar or equal to the frequency of at least one of the sensing signals used to drive the sensor electrodes of the input device. Thus, the input object 200 may be configured to have a resonance (or resonant) frequency that is substantially the same as a defined frequency of the sensing signals. Further, the input object 200 may be configured to have a resonance frequency substantially the same as any of a plurality of defined frequencies of the sensing signals. In other words, each respective resonance frequency of the input object is within a threshold distance of a defined frequency of the sensing signals. Thus, the effects of a respective input object are amplified when the sensing signals have substantially the same resonance frequency. Selection of the respective resonance frequency for the input object 200 may depend on selection of a different capacitance for capacitor 206.

Further with respect to FIG. 2, input object 200 includes a tip 208. The tip 208 is the portion of the input object which may contact the sensing region of the input device. In other words, the tip 208 may alter the measured capacitance of the sensing region. As shown with respect to FIG. 2, the tip 208 is coupled to the capacitor 206 and the inductor 202. The capacitor 206 and inductor 202 cause the tip 208 to have a resonating frequency and to be in a resonating state when coupled to an input device driven by a transmitter. More specifically, the resonating state occurs when the input object 200 resonates at a selected transmitter frequency and the tip 208 is coupled to the inductor 202 and the capacitor 206 in parallel. This is in contrast to a non-resonating input object, such as a finger or stylus having a tip that does not resonate and is instead grounded.

Although FIG. 2 shows a certain configuration of components, other configurations may be used without departing from the scope of the example embodiments. For example, in some embodiments, a switch may selectively couple the tip 208 to the grounding element 210 to change the input object from a resonating state to a non-resonating state. In other embodiments, one or more resistors may be added in parallel or in series with the capacitor 206 to reduce a Q factor of the circuit—however, inclusion of such resistors may also reduce a peak signal of the circuit.

Returning to FIG. 1, the processing system 110 may further include functionality to identify a finger or another non-resonating object, and a portion of a hand, such as a palm. In some embodiments, the processing system 110 may be configured to report the non-resonating object even when the input object 200 is resonating and detected in the sensing region 120. In other embodiments, the processing system 110 may be configured to suppress reporting of large input objects such as a hand or palm, which may be inadvertently detected in the sensing region.

In one or more embodiments, the processing system 110 may detect inputs in the sensing region 120 in a series of frames. Each frame represents a length of time to perform a single capture of the state of the sensing region with respect to the existence of one or more input objects. The length of time may vary among frames and with the number of detected input objects. For example, if no input object is detected, the length of time may be shorter than when an input object is detected and additional processing is performed. In one or more embodiments, at the end of a frame, a report may be transmitted to other components of the processing system 110, input device 100, host system, or another device. Each report may include positional information and frequency information regarding any input objects detected in the sensing region.

Figure 3:
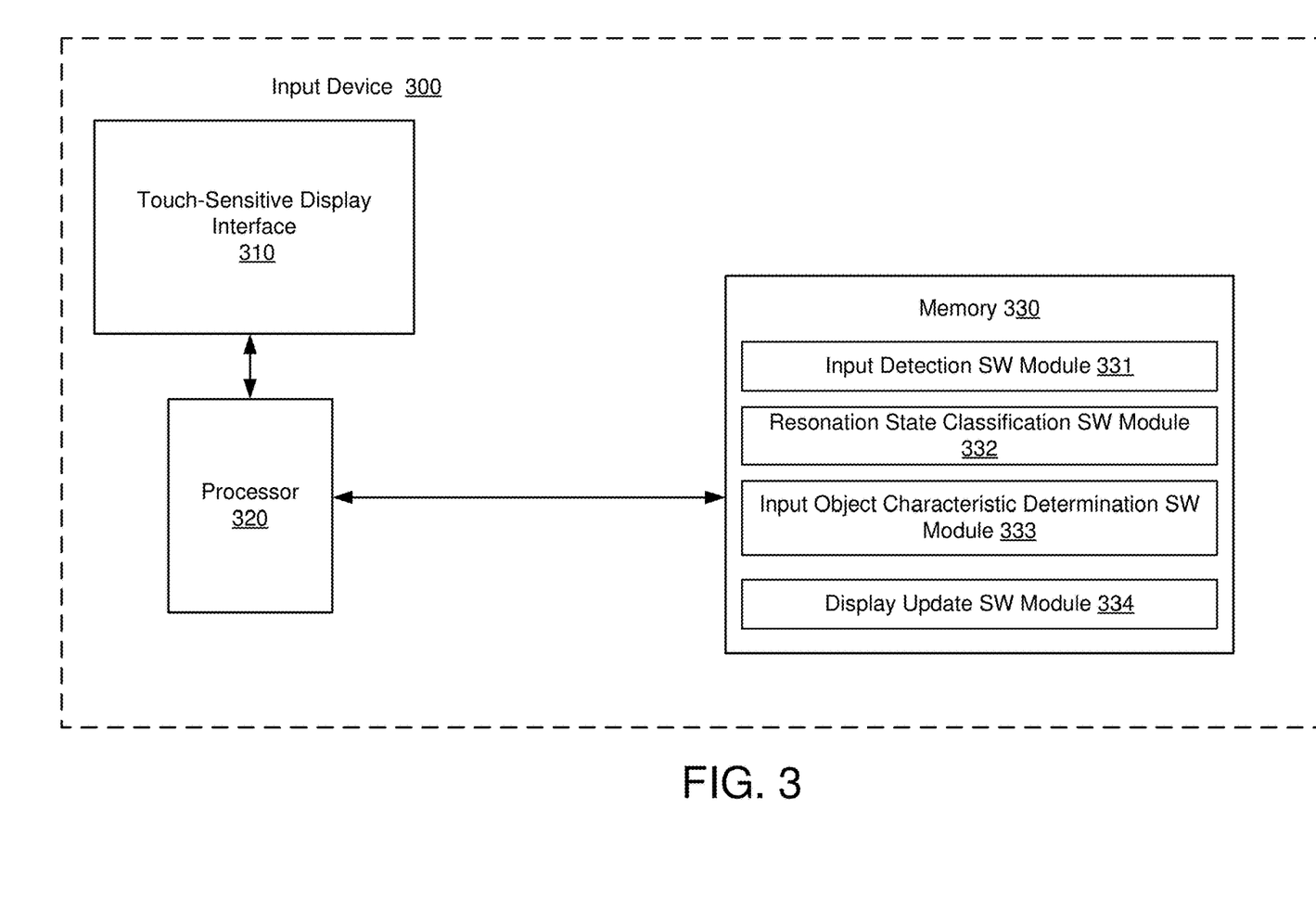
FIG. 3 shows an example input device, in accordance with some embodiments.

FIG. 3 is a block diagram of an input device 300 for characterizing user contacts, in accordance with some embodiments. The input device 300 includes a touch-sensitive display interface 310, a processor 320, and a memory 330. The touch-sensitive display interface 310 may be configured to communicate with a touch sensitive display, such as a smart whiteboard, a touch-sensitive monitor, or another suitable touch-sensitive display. Touch-sensitive display interface 310 may be configured to communicate with a touch sensitive display including a sensing region in which the touch-sensitive display is able to detect user input, such as provided by one or more input objects (not shown for simplicity). The size, shape, and/or location of the sensing region may vary. Touch-sensitive display interface 310 may further be coupled to a set of capacitive sensors and force sensors. The capacitive sensors may detect inputs in the sensing region using capacitive sensing techniques (such as described above). For example, the capacitive sensors may include an array of sensor electrodes that create an electric field in and/or around the sensing region. Input device 300 may detect inputs based on changes in a capacitance of the sensor electrodes and/or the electric field.

The memory 330 may include a non-transitory computer-readable medium (e.g., one or more nonvolatile memory elements, such as EPROM, EEPROM, Flash memory, a hard drive, etc.) that may store at least the following software (SW) modules:

an input detection SW module 331 to detect inputs in the sensing region of a touch-sensitive display coupled to the touch-sensitive display interface 310;
a resonation state classification SW module 332 to classify detected inputs as being made by either a resonating input object or a non-resonating input object;
an input object characteristic determination SW module 333 to determine input object characteristics for the detected inputs; and
a display update SW module 334, to update the touch-sensitive display based at least in part on one or more input object characteristics of the detected inputs.

Each software module includes instructions that, when executed by the processor 320, cause the input device 300 to perform the corresponding functions. The non-transitory computer-readable medium of memory 330 thus includes instructions for performing all or a portion of the operations described below with respect to FIG. 8.

Processor 320 may be any suitable one or more processors capable of executing scripts or instructions of one or more software programs stored in the input device 300 (e.g., within memory 330). For example, the processor 320 may execute the input detection SW module 331 to detect inputs in the sensing region of a touch-sensitive display coupled to the touch-sensitive display interface 310. The processor 330 may also execute the resonation state classification SW module 332 to classify detected inputs as being made by either a resonating input object or a non-resonating input object. The processor 330 may also execute the input object characteristic determination SW module 333 to determine input object characteristics for the detected inputs. The processor may also execute the display update SW module 334, to update the touch-sensitive display based at least in part on one or more input object characteristics of the detected inputs.

As discussed above, a resonating input object may have a predetermined resonance frequency. With reference, for example, to FIG. 2, the capacitances of capacitor 206 and trim capacitor 204 may determine the resonance frequency of the input object 200. According to the present embodiments, an input device may associate various characteristics to an input object based at least in part on its resonance frequency. For example, an input device may assign each input object having a specified resonance frequency a respective color, such that user inputs made by such input objects are displayed (e.g., in a visual interface) in the respective colors. Thus, when the user provides input using the input object (such as drawing on a touch-sensitive display), the input device may display or render the input in the corresponding color. An example input device may be capable of characterizing user input by objects having each of a plurality of resonance frequencies. Characterizing user input based on a resonance frequency of a corresponding input object may also be referred to as determining or associating a respective input object characteristic with the input object.

The characteristics that may be assigned to input objects (e.g., with different resonance frequencies) are not limited to display colors. For example, inputs associated with a specified resonance frequency may be associated with a particular user, or another characteristic useful for distinguishing different categories of input. In other words, any user input associated with a particular resonance frequency may be attributed the same input object characteristic(s).

Because each resonance frequency may be associated with a respective input object characteristic, any input object having a particular resonance frequency may be used on the touch-sensitive display to provide user input having the associated input object characteristic. For example, all input objects having a specified resonance frequency may be associated with a particular color, a particular user, and the like. Further, a non-resonating input object may be distinguished from a resonating input object—for example, while a resonating input object has a frequency response which peaks at its resonance frequency, a non-resonating input object has a frequency response which varies little (if at all) with respect to frequency. Non-resonating input objects such as fingers or non-resonating pens may also be associated with a corresponding input object characteristic. Thus, in accordance with the example embodiments, an input device may detect an input object in contact (or in close proximity) with the touch-sensitive screen, and determine an input object characteristic based on the resonance frequency of the input object. The input device may then attribute the input object characteristic to subsequent inputs made with that input object.

Further, example input devices may detect and characterize multiple objects concurrently. For example, an input device may detect a first input from a first input object, determine that the first input object is associated with a first input object characteristic (e.g., based on the resonance frequency of the first input object), and update the display based on subsequent inputs made using the first input object. More specifically, the updates to the display may be based on the first input object characteristic. For example, the input device may determine that the first input object has a resonance frequency which corresponds to a red display color. Thus, subsequent display updates may trace the inputs provided by the first input object in a red color. Furthermore, while detecting inputs from the first input object (e.g., and displaying those inputs in red), the input device may detect a second input from a second input object, determine that the second input object has a resonance frequency which corresponds to a blue color, and display subsequent inputs from the second input object in blue. In other words, an example input device may be capable of concurrently displaying inputs from multiple input objects, each input object having a different resonant frequency, and a different corresponding input object characteristic.

In some embodiments, because input objects are associated with input object characteristics based on their respective resonance frequencies, two input objects having the same resonance frequency may be associated with the same input object characteristic. Thus, if, subsequent to the detected input from the second input object, a third input is detected from a third input object having the same resonance frequency as the second input object, the input device will determine, based on this resonance frequency, that subsequent inputs from the third input object are also to be displayed in blue.

Figure 4:
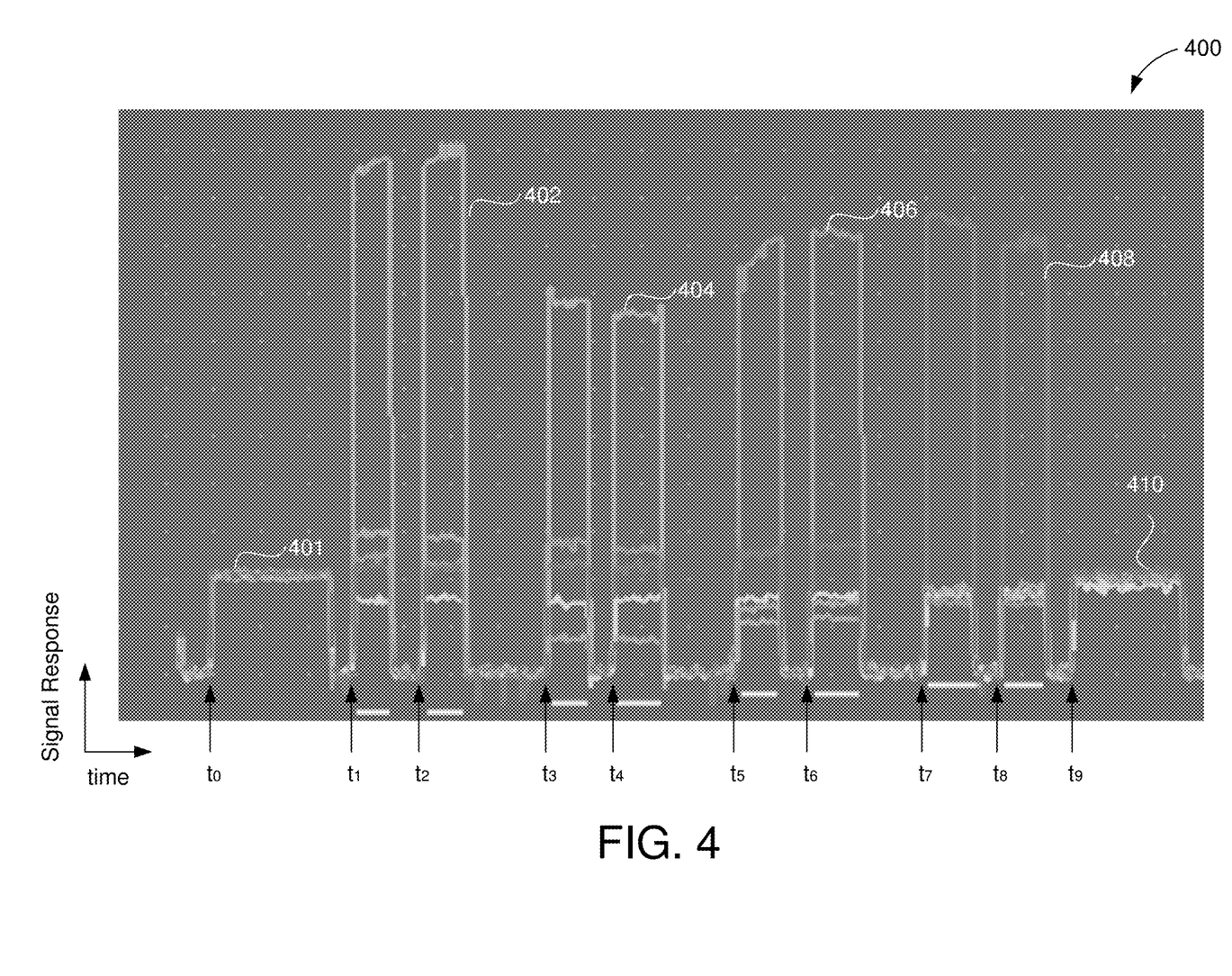
FIG. 4 shows a plot of frequency responses of input objects, in accordance with some embodiments.

FIG. 4 shows an example plot 400 showing multiple inputs made using different input objects on a touch-sensitive input device, according to the example embodiments. More particularly, with respect to FIG. 4, a first input is made by a non-resonating input object (e.g., at time $t_0$). Subsequently, two inputs are made by a first resonating input object (e.g., at time $t_1$ and $t_2$), followed by two inputs made by a second resonating input object (e.g., at time $t_3$ and $t_4$), followed by two inputs by a third resonating input object (e.g., at times $t_5$ and $t_6$), followed by two inputs by a fourth resonating input object (e.g., at times $t_7$ and $t_8$). Finally, another contact is made by the non-resonating input object (e.g., at time $t_9$).

Each waveform depicted in FIG. 4 corresponds to a measure of signal strength at a respective frequency, or in a respective frequency band, at a given time. More particularly, these waveforms may correspond to signals received from an analog to digital converter (ADC) of the input device—there may be an ADC output for each tactile pixel (or "tixel"), and the waveforms may be a summation of such ADC outputs. Thus, the waveforms 401 and 410 for the inputs made by the non-resonating input object are substantially similar in amplitude. In contrast, each of the inputs by the resonating input objects has a predominant waveform (e.g., waveform 402 of the first resonating input, waveform 404 for the second resonating input, waveform 406 for the third resonating input, and waveform 408 for the fourth resonating input), while the remaining waveforms associated with each of the resonating input objects have much lower values (e.g., similar in amplitude to the waveforms 401 and 410 associated with the non-resonating object). Thus, an input device may determine the input object characteristic by detecting at least a threshold level of energy at a frequency associated with that particular input object characteristic.

As described above with respect to FIG. 2, an input object may include a trim capacitor (such as trim capacitor 204 of input object 200). In some embodiments, the trim capacitor may be adjusted to allow for fine tuning of the resonant frequency of the input object. Further, adjusting the trim capacitor may also demonstrate how determination of an input object characterization may be complicated by resonator drift.

Figure 5:
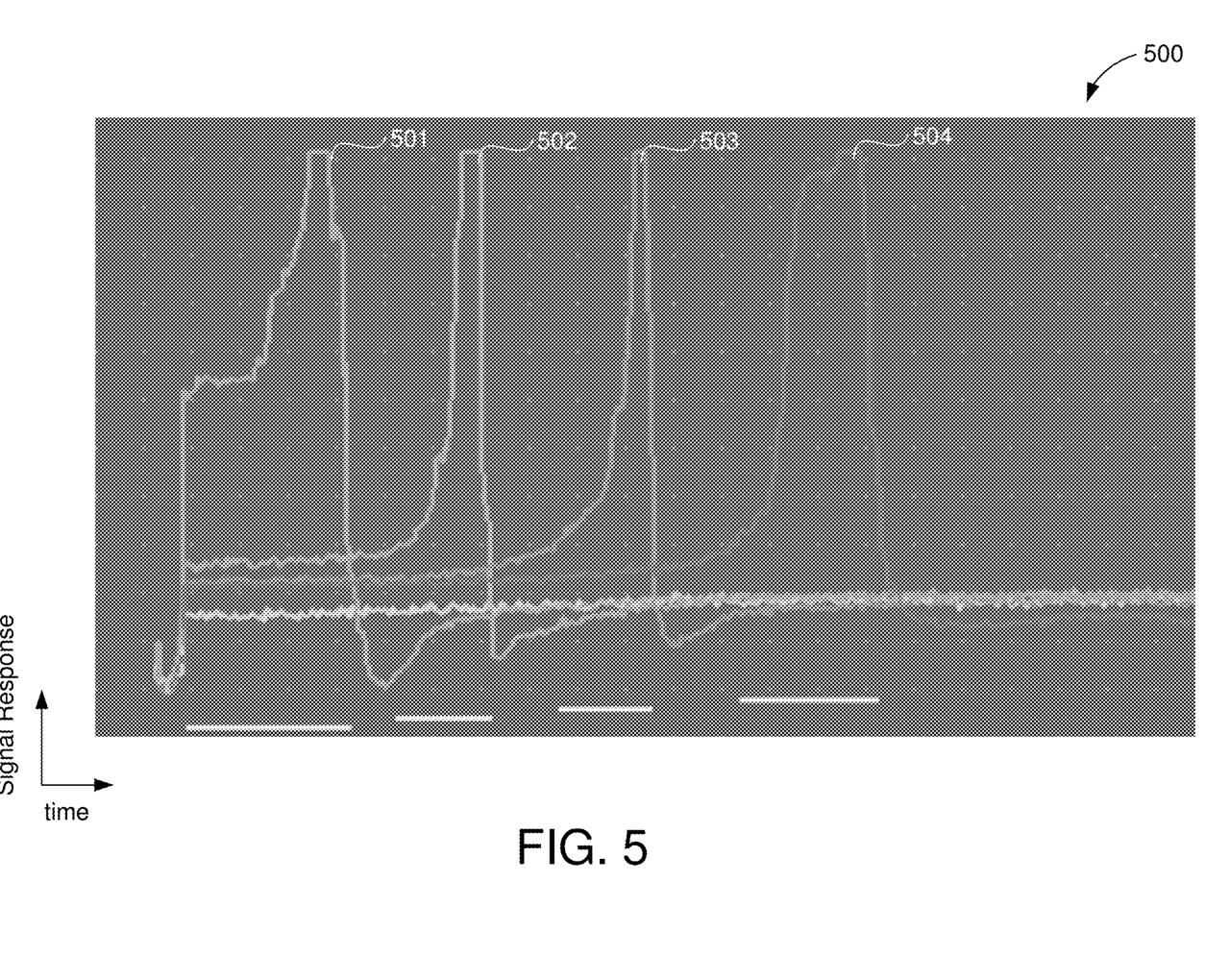
FIG. 5 shows another plot of frequency responses of input objects, in accordance with some embodiments.

FIG. 5 shows a plot 500 depicting an example adjustment of a trim capacitor, in accordance with some embodiments. Similar to FIG. 4, FIG. 5 shows four different waveforms—501, 502, 503, and 504—each associated with a response at a corresponding frequency. Each waveform depicts the energy at a respective frequency associated with an input object characteristic. While the input is detected and/or measured, a trim capacitor of the input object is adjusted over time. For example, the response at a first frequency corresponds to waveform 501, the response at a second frequency corresponds to waveform 502, and so on. As the trim capacitor is adjusted, the resonant frequency of the input object changes from a range of frequencies where a first input object characteristic has a largest signal response—where waveform 501 has a largest signal response—to ranges of frequencies where respective waveforms 502, 503, and 504 predominate—respectively corresponding to second, third, and fourth input object characteristics. Note that there is also a fifth waveform depicted on FIG. 5, the fifth waveform associated with a resonance frequency much higher than waveforms 501-504. While this waveform is substantially constant while the trim capacitor is tuned in FIG. 5, the fifth waveform may be used, for example as a reference waveform for detecting resonation.

As seen with respect to FIG. 5, adjustment of the trim capacitor adjusts the resonance frequency of the input object, and has a significant impact on the waveforms corresponding to each resonance frequency. However, there are also settings of the trim capacitor for which it is unclear which characteristic should be applied. For example, when the trim capacitor is further adjusted after the first waveform 501 reaches its peak (positive) value, there is a steep drop-off in the amplitude of the first waveform 501 to a negative value. When the amplitude of the waveform 501 is at or below that of the other waveforms 502-504, it may be difficult to tell which waveform—and thus, which input object characteristic—should be attributed to the input object. Note further that while it may be unclear, for some values of the trim capacitance, which input object characteristic should be attributed to a particular input, it is still readily apparent that a resonating input object is being used to provide input via the touch-sensitive screen.

Resonator frequencies may also drift depending on temperature. As shown above with respect to FIG. 5, mismatch between the resonant frequency of an input object and the transmitter frequency of an input device may prevent an input device from accurately determining which characteristic to apply to an input.

Figure 6:
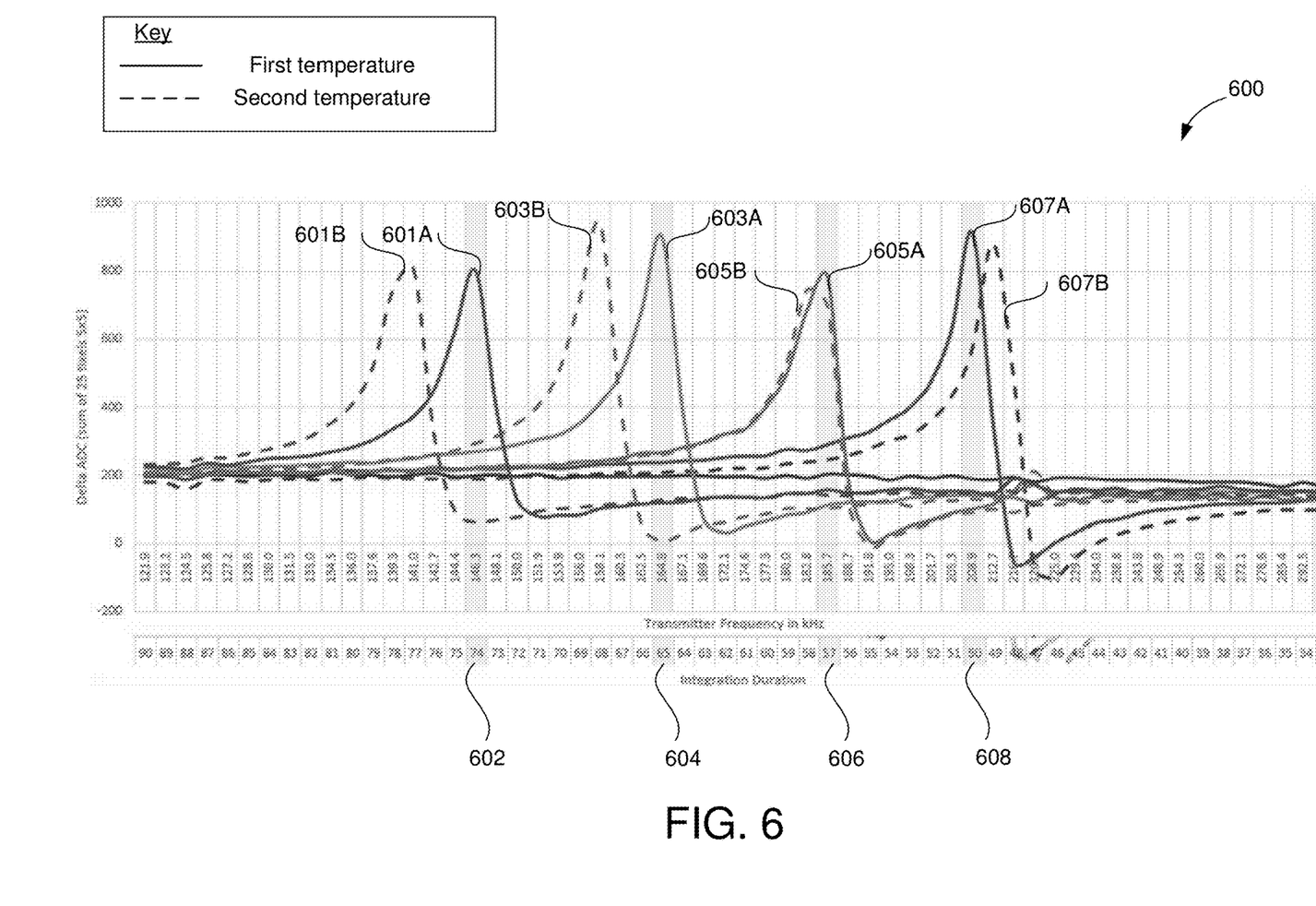
FIG. 6 shows a plot of the temperature dependency of frequency responses of input objects, in accordance with some embodiments.

FIG. 6 shows a plot 600 depicting example frequency responses of four input objects at each of a first temperature and a second temperature, were the second temperature is higher than the first temperature. With respect to FIG. 6, a first input object may have a first frequency response 601A at the first temperature (depicted as a solid line), and a second frequency response 601B at the second temperature (depicted as a dashed line). At the first temperature, the first input object has a maximum frequency response—in other words, the resonant frequency of the first input device—at a frequency 602 (e.g., the first frequency response 601A peaks at 146.3 kHz). However, at the second temperature, the first input object has a negative frequency response at frequency 602 (e.g., the second frequency response 601B is negative at 146.3 kHz). Similarly, a second input object may have a first frequency response 603A at the first temperature, and a second frequency response 603B at the second temperature. Note that the first frequency response 603A peaks at a frequency 604 (e.g., 164.8 kHz), and that the second frequency response 603B has a negative value at frequency 604. The mismatch at the second temperature may cause an input device to fail to correctly characterize inputs by the first and second input objects.

It is noted that the temperature drift of an input object may vary from object to object. For example, a third input object may have a first frequency response 605A at the first temperature, and a second frequency response 605B at the second temperature. Note that the first frequency response 605A peaks at a frequency 606 (e.g., 185.7 kHz). However, the drift in the frequency response of the third input object, from the first frequency response 605A to the second frequency response 605B, may not be enough to significantly impair characterization of the third input object, as the second frequency response 605B remains much higher than the frequency responses of the other input devices at frequency 606.

It is also noted that the temperature-dependent frequency drift may be upwards or downwards. For example, a fourth input object may have a first frequency response 607A at the first temperature, and a second frequency response 607B at the second temperature. Note that the first frequency response 607A peaks at a frequency 608 (e.g., 208.9 kHz), whereas the second frequency response 607B peaks at an even higher frequency (e.g., 212.7 kHz). Thus, the drift in the frequency response of the fourth input object is in the opposite direction as that of the first, second, and third input objects (e.g., from the first temperature to the second temperature). However, the direction of drift may be consistent for each input object having including identical components, such as the inductor 202 and capacitor 206 of FIG. 2.

Further, as noted above, even when resonator drift causes a mismatch between the resonant frequency of an input object and the transmitter frequency of an input device, it may be clear that a resonating input object has been detected in a sensing region of the touch-sensitive screen. Accordingly, upon detecting such a mismatch, an input device may adjust a frequency band corresponding to a given input object. For example, an input device may detect the presence of a resonating input object in the sensing region of a touch-sensitive surface of the input device, and determine that a frequency response at a corresponding frequency for the resonating input object is below a current threshold. In response, the frequency associated with the input object may be adjusted in a predetermined direction (e.g., to align the resonant frequency of the input object with the frequency of the characteristic to be applied to that input object). For example, the threshold may be zero—in other words, a frequency response may be detected having a negative value at the corresponding frequency—such as shown in FIG. 6 where frequency response 601B has a negative value at frequency 602. In response, the input device may adjust frequency 602 downward, towards the peak of frequency response 601B (e.g., 141 kHz). This adjustment may also be of a predetermined size. For example, the input device may adjust frequency 602 downward by a predetermined amount in response to detecting the frequency response below the threshold. Such an adjustment may reduce the frequency mismatch and improve characterization of the input object.

In another example, the threshold may be positive. More particularly, the input device may first determine which type of input object—in other words, which resonance frequency of the input object—has contacted the touch-sensitive display, by determining that the response at the corresponding frequency exceeds the response at the frequencies corresponding to the other types of input object. However, although the input device correctly determines the type of input object, a response below the threshold level may indicate a lack of robustness to noise or frequency drift. For example, see frequency response 605B at the second temperature in FIG. 6. At frequency 606, frequency response 605B is clearly the identifiable versus the other three input objects, but is substantially less than its peak value, and so with further temperature drift or additional noise, characterization may be impaired. Accordingly, the frequency 606 may be adjusted toward the peak value—in other words, in the opposite direction as the direction of adjustment when a negative response is detected.

Appropriate determination of the frequencies corresponding to each input object may be an important step in accurately characterizing user contacts on the input device. Accordingly, the example embodiments also support calibration operations for determining and adjusting these frequencies. In some embodiments, such a calibration operation may be performed upon determining that a frequency response has less than a threshold value at a corresponding frequency. For example, such a calibration may be performed upon determining that a "red" input object has a frequency response less than the threshold value at the frequency corresponding to the "red" input object characteristic. Alternatively, calibration may be performed periodically, upon launch of an application requiring user object input, upon detection of a predetermined difference in temperature, or other suitable conditions.

Figure 7:
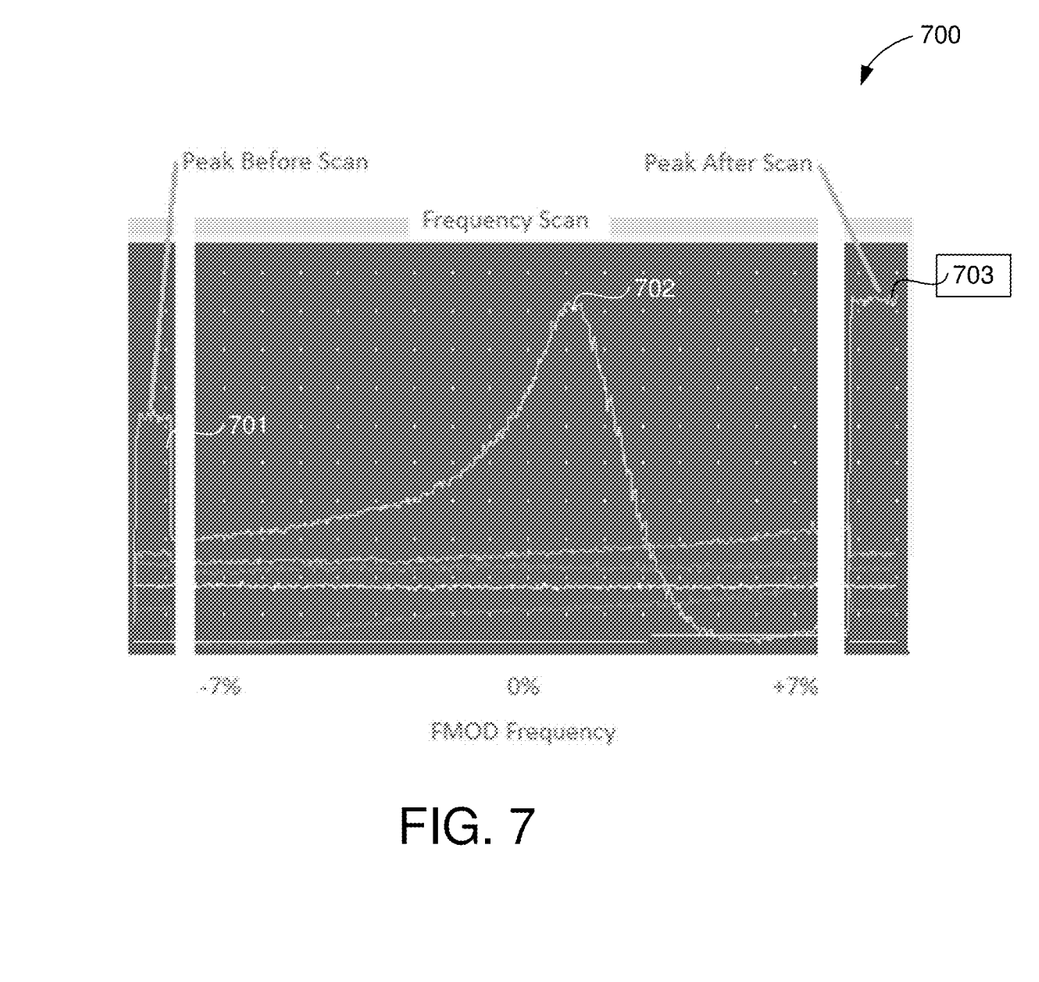
FIG. 7 shows a plot of a frequency response of an input object before, during, and after a calibration operation, in accordance with some embodiments.

FIG. 7 shows an example calibration operation for an input object, according to some embodiments. FIG. 7 shows waveforms similar to those in FIGS. 4-5, where each waveform corresponds to an amount of energy at a frequency corresponding to an input object characteristic (e.g., color). With respect to FIG. 7, note initial peak value 701. While this peak value exceeds the values of the other waveforms, allowing the correct input object characteristic to be determined, this peak value is not optimally selected, and may be less than a threshold value. For example, when peak value 701 is less than the threshold value, there may be a mismatch between the resonant frequency of the input object and the assigned frequency for the input object characteristic. A calibration operation may then be performed. During a calibration operation, a user may be directed to contact the touch-sensitive screen with the input object to be calibrated, and to maintain this contact for a given duration. A range of frequencies may be scanned, including a number of frequencies adjacent to the frequency of the input object characteristic. Note that while the calibration operation is described here as a separate operation, in other embodiments such calibrations may be "on the fly," and may be conducted without user direction. More particularly, such calibration operations may be performed during normal operation of an input device, and may begin, pause, and resume depending on user actions.

For example, with respect to FIG. 7, a range of frequencies spanning from 7% below the frequency of the input object characteristic to 7% above, where 0% represents the frequency corresponding to initial peak value 701. A frequency may be selected to maximize waveform 702—to correct for the frequency mismatch. The selected frequency may be assigned as an adjusted frequency of the input object characteristic. For example, the adjusted frequency may have an adjusted peak value 703. It is noted that, in comparing adjusted peak value 703 to initial peak value 701—adjusted peak value 703 is approximately 50% larger than initial peak value 701, and thus more easily distinguished from the other waveforms, even in the presence of noise or frequency drift.

Further, in accordance with some other embodiments, a calibration operation may not select the peak value of the waveform. Instead, such a calibration operation may select a frequency to avoid the steep drop-off noted in the frequency responses of FIGS. 6-7. For example, with respect to FIG. 7, a frequency slightly below (i.e., to the left of, in FIG. 7) the frequency associated with adjusted peak value 703 may be selected. Selecting such a frequency may reduce a likelihood that noise or temperature-related frequency drift causes the steep drop-off in waveform 702 to interfere with input object characterization.

As described above, an example input device may detect an input object in a sensing region of a touch-sensitive surface, determine that the input object is a resonating input object, and determine an input object characteristic associated with the input object. This characterization may require a period of time to complete, and multiple frames may be displayed during this period of time. During the time after the input has been detected, and before the input object has been characterized, further user input may be made using the input object. Such user input may be displayed based on a predetermined input object characteristic, such as an input object characteristic used for non-resonating input objects. Alternatively, such user input may be displayed based on an input object characteristic associated with recently-received or closest proximity user input from a characterized input device. For example, if a "red" pen is detected in the sensing region of a touch-sensitive display, before the input device characterizes this pen, user input made with the "red" pen may be displayed using a color associated with non-resonating pen, or with a color associated with a recently used resonating pen, or with a color used within a specified proximity of the contact. After characterization, subsequent user input using the "red" pen may be displayed in red.

According to some example embodiments, after an input object has been characterized, the associated input object characteristic may be applied to prior input made using the input object. More specifically, the associated input object characteristic may be applied to user input made after the input has been detected, and before the input object is characterized. For example, a user may contact a touch-sensitive display using a "red" pen, and make further user input with the "red" pen before the input device characterizes the pen as red in color. As described above, user input during this time may be displayed based on a predetermined input object characteristic. When the "red" pen is characterized, the red color may be applied to the prior user input made before the pen was characterized.

The example embodiments may be used in a variety of contexts where concurrently displaying touch input from multiple input objects, and distinguishing among multiple types of input object may be desired. For example, as mentioned above, an input device may be a smart whiteboard, on which multiple resonating pens may be used. In such an example, input object characteristics may correspond to different colors, patterns, line widths, or paint brushes for displaying user input by each type of resonating pen, or users, such that all user input from a given type of resonating pen (i.e., of a given resonance frequency) is associated with a corresponding user. Alternatively, line widths may be determined based on a detected width of the tip of each resonating pen (e.g., tip 208 of input device 200 of FIG. 2, or based on a user-selected width. In addition, one or more input object characteristics may correspond to functions for use on the whiteboard, such as an eraser function.

In another example, the input device may be used with a touch-sensitive application having a number of resonating pieces. For example, if the application is a checkers application, each red and black piece may have a resonance frequency corresponding to their color. The input device may comprise a touch-sensitive display showing the game board. Contact between a piece and the display may be sensed and characterized to determine the state of the game board. Similar approaches may be used for other games, and for other similar applications where physical objects may be placed on a board to define an application state. For example, a resonating "pin" could correspond to a person, and a user could place the "pin" on a digital map to denote a location, which may then be recognized by the application as associating the person with the denoted location on the digital map.

Further, while a resonance frequency of each input object may correspond to a respective input device characteristic, in accordance with some embodiments, additional input device characteristics may be associated with a given input device. A user may select one or more additional input object characteristics for application to user input with the given input object. For example, a user may use the given input object to select the additional characteristics on a user interface of the touch-sensitive display. Such additional input object characteristics may include, for example, line widths, patterns, or paintbrushes for displaying user input. Further, the additional input object characteristic may include an input object specific eraser setting, for erasing previous user input made using the given input object. After selecting an additional input object characteristic for a given input object, the selected characteristic may be applied to subsequent input by the given input object.

Figure 8:
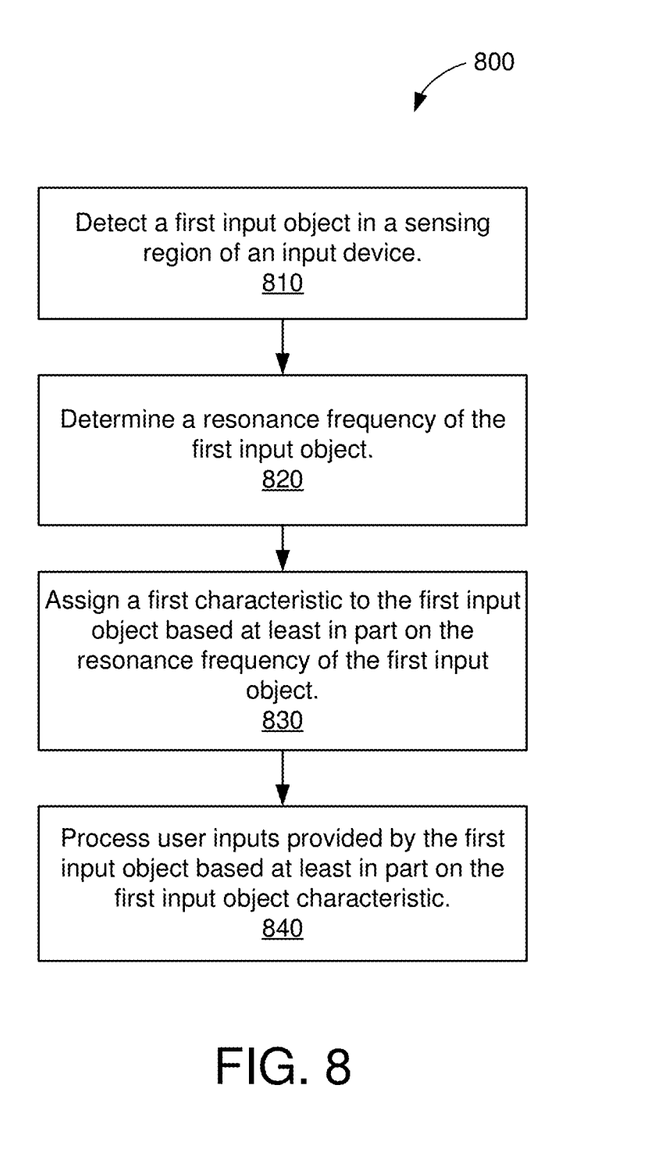
FIG. 8 is an illustrative flowchart depicting an example operation for characterizing a first user input on a touch sensitive display, in accordance with some embodiments.

FIG. 8 is an illustrative flowchart depicting an example operation 800 for characterizing user contacts on a touch-sensitive display of an input device, in accordance with some embodiments. The operation 800 may be performed by a suitable input device, such as input device 300 of FIG. 3. With respect to FIG. 8, a first input object is detected in a sensing region of the input device (810). For example, the first user may be detected by touch-sensitive display interface 310 by executing input detection SW module 331 of input device 300 of FIG. 3. A resonance frequency of the first input object may be determined (820). For example, the determination may be made by executing resonation state classification SW module 332 or input object characteristic determination SW module 333 of input device 300 of FIG. 3. A first characteristic may be assigned to the first input object based at least in part on the resonance frequency of the first input object (830). For example, the characteristic may be assigned by executing input object characteristic determination SW module 333 of input device 300 of FIG. 3. User inputs provided by the first input object may then be processed based at least in part on the first input object characteristic (840). For example, the subsequent user input may be displayed by executing display update SW module 334 of input device 300 of FIG. 3.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for characterizing user inputs, the method comprising:
   detecting first user input provided by a first input object in a sensing region of an input device;
   applying a predetermined input object characteristic to the detected first user input;
   determining a resonance frequency of the first input object in response to detecting the first user input;
   assigning a first characteristic to the first input object based at least in part on the resonance frequency of the first input object, the first characteristic being different than the predetermined input object characteristic; and
   in response to assigning the first characteristic to the first input object, applying the first characteristic to the detected first user input and to subsequent user inputs provided by the first input object.

2. The method of claim 1, wherein the assigning comprises:
   selecting the first characteristic from a plurality of characteristics, wherein each of the plurality of characteristics is associated with a respective resonant frequency.

3. The method of claim 2, wherein each of the plurality of characteristics comprises a respective color for displaying corresponding user inputs in a visual interface of the input device.

4. The method of claim 1, wherein the determining comprises:
   determining that the first input object is a non-resonating input object.

5. The method of claim 1, further comprising:
   detecting a second input object in the sensing region, the second input object having a different resonance frequency than the first input object;
   assigning a second characteristic to the second input object based at least in part on the resonance frequency of the second input object; and
   displaying user inputs provided by each of the first and second input objects, concurrently, in a visual interface of the input device.

6. The method of claim 1, further comprising:
   receiving a user selection of a characteristic modifier for the first characteristic; and
   applying the selected characteristic modifier to subsequent user inputs provided by the first input object.

7. The method of claim 1, further comprising:
   determining that a frequency response at a frequency associated with the first characteristic is below a threshold; and
   adjusting the frequency associated with the first characteristic so that the frequency response at the adjusted frequency is at or above the threshold.

8. The method of claim 7, wherein adjusting the frequency associated with the first characteristic comprises:
   scanning a range of frequencies adjacent to the frequency associated with the first characteristic; and
   selecting the adjusted frequency from the range of adjacent frequencies, the adjusted frequency having the largest frequency response among the scanned frequencies.

9. The method of claim 1, further comprising:
   determining that a frequency response at a frequency associated with the first characteristic is negative; and
   shifting the frequency associated with the first characteristic by a predetermined amount in a predetermined direction.

10. An input device, comprising:
    one or more processors;
    a touch-sensitive sensing region; and
    a memory, storing one or more programs comprising instructions, that, when executed by the one or more processors, cause the input device to:
    detect first user input provided by a first input object in the touch-sensitive sensing region;
    apply a predetermined input object characteristic to the detected first user input;
    determine a resonance frequency of the first input object based on detecting the first user input;
    assign a first characteristic to the first input object based at least in part on the resonance frequency of the first input object, the first characteristic being different than the predetermined input object characteristic; and
    in response to assigning the first characteristic to the first input object, apply the first characteristic to the detected first user input and to subsequent user inputs provided by the first input object.

11. The input device of claim 10, wherein the instructions to assign the first characteristic to the first input object further execute to:
    select the first characteristic from a plurality of characteristics, wherein each of the plurality of characteristics is associated with a respective resonant frequency.

12. The input device of claim 11, wherein each of the plurality of characteristics comprises a respective color for displaying corresponding user inputs in a visual interface of the input device.

13. The input device of claim 10, wherein the instructions further execute to:
    detect a second input object in the touch-sensitive sensing region, the second input object having a different resonance frequency that the first input object;
    assign a second characteristic to the second input object based at least in part on the resonance frequency of the second input object; and
    display user inputs provided by each of the first and second input objects, concurrently, in a visual interface of the input device.

14. The input device of claim 10, wherein the instructions further execute to:
    receive a user selection of a characteristic modifier for the first characteristic; and
    apply the selected characteristic modifier to subsequent user inputs provided by the first input object.

15. The input device of claim 10, wherein the instructions further execute to:

determine that a frequency response at a frequency associated with the first characteristic is below a threshold; and adjust the frequency associated with the first characteristic so that the frequency response at the adjusted frequency is at or above the threshold.

16. The input device of claim 15, wherein the instructions which execute to adjust the frequency associated with the first characteristic further cause the input device to:

scan a range of frequencies adjacent to the frequency associated with the first characteristic; and selecting the adjusted frequency from the range of adjacent frequencies, the adjusted frequency having the largest frequency response among the scanned frequencies.

17. The input device of claim 10, wherein the instructions further execute to:

determine that a frequency response at a frequency associated with the first characteristic is negative; and shifting the frequency associated with the first characteristic by a predetermined amount in a predetermined direction.

18. A non-transitory computer-readable storage medium storing instructions that, when executed by processing circuitry of an input device, cause the input device to perform operations comprising:

detecting first user input provided by a first input object in a sensing region of the input device;

applying a predetermined input object characteristic to the detected first user input;

determining the resonance frequency of the first input object based on detecting the first user input;

assigning a first characteristic to the first object based at least in part on the resonance frequency of the first input object, the first characteristic being different than the predetermined input object characteristic; and in response to assigning the first characteristic to the first input object, applying the first characteristic to the detected first user input and to subsequent user inputs provided by the first input object.

* * * * *

UNITED STATES PATENT AND TRADEMARK OFFICE
CERTIFICATE OF CORRECTION

PATENT NO. : 11,099,687 B2
APPLICATION NO. : 15/710169
DATED : August 24, 2021
INVENTOR(S) : Tom R. Vandermeijden, Jeffrey Lukanc and Timothy J. Vehling Page 1 of 1

It is certified that error appears in the above-identified patent and that said Letters Patent is hereby corrected as shown below:

In the Claims

In Column 18, Line 53, in Claim 13, delete "that" and insert -- than --

Signed and Sealed this
Fifth Day of October, 2021

Drew Hirshfeld
*Performing the Functions and Duties of the
Under Secretary of Commerce for Intellectual Property and
Director of the United States Patent and Trademark Office*